Patented Dec. 23, 1947

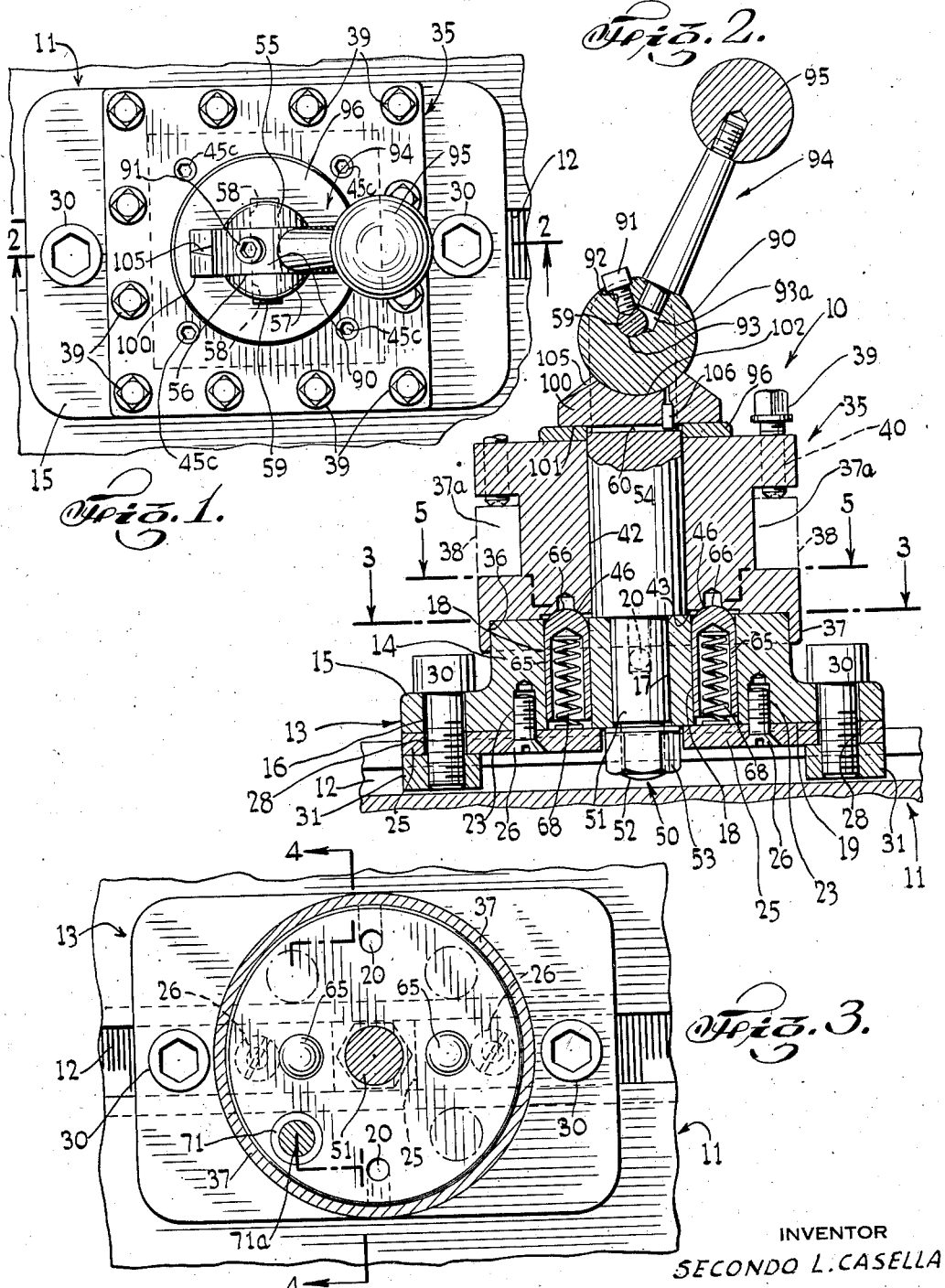

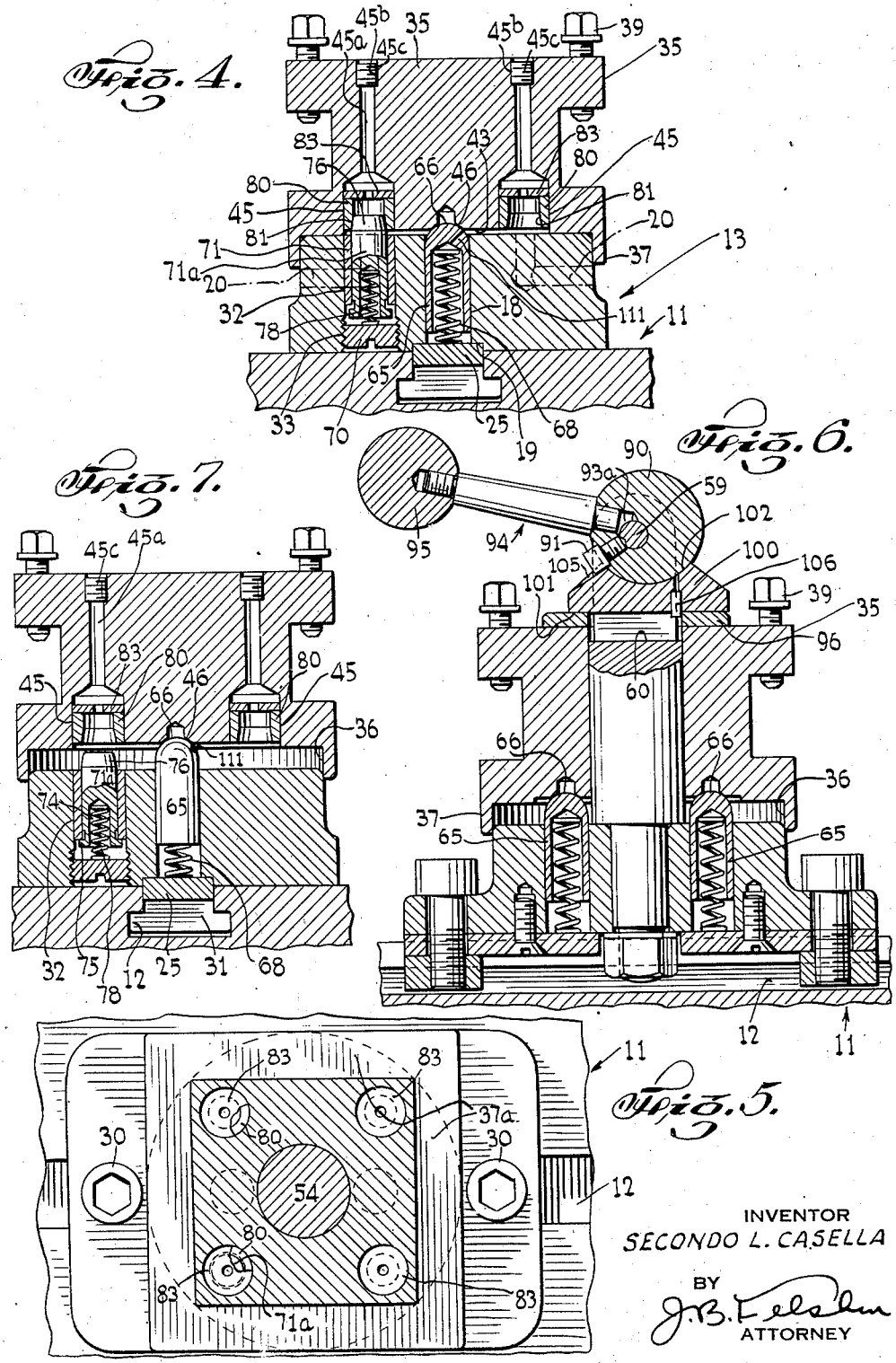

2,433,026

UNITED STATES PATENT OFFICE 2,433,026

TURRET TOOL BLOCK

Secondo L. Casella, New York, N. Y., assignor to Morey Machinery Co., Inc., New York, N. Y., a corporation Application February 25, 1943, Serial No. 477,071

6 Claims. (Cl. 29—49)

This invention relates to turret tool blocks.

An object of this invention is to provide a tool block of the character described comprising a tool holder mounted for rotation on a base, and means for locking the tool holder in a plurality of indexed positions on the base, the locking means normally projecting above the base, and spring means being provided to lift the tool holder when it is released, to a position where it clears the locking pin whereby it may be rotated to another index position, said spring means furthermore being adapted to locate the tool holder in each of a plurality of index positions to facilitate locking the tool holder to the base in such positions.

Another object of the present invention is to provide in a turret tool block of the character described, highly improved means for clamping the tool holder to the base in its various indexed positions, said clamping means comprising an eccentric cam and a cam shoe interposed between the cam and the tool holder, movable with the cam upon rotating the cam and forming a wedge between the cam and the tool holder to firmly clamp the tool holder in indexed position when the cam is rotated to clamping position.

Another object of the present invention is to provide in a turret tool block of the character described, improved stop means to limit rotation of the cam in releasing position, and additional means to insure the cam shoe from coming out from between the cam and tool holder when the cam is swung to releasing position.

Still another object of the present invention is to provide in a turret tool block of the character described, improved means to facilitate the reciprocating movement between the tool holder and the tool base and prevent binding between said members.

Yet another object of the present invention is to provide a compact, rugged and durable turret tool block of the character described, which shall be relatively inexpensive to manufacture, smooth and positive in operation and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of a turret tool block embodying the invention, on a cross slide of a lathe showing the tool block in locking condition;

Fig. 2 is a cross-sectional view taken on line 2—2 of Fig. 1;

Fig. 3 is a cross-sectional view taken on line 3—3 of Fig. 2 and showing some of the openings for receiving the locking pin in dot and dash lines;

Fig. 4 is a cross-sectional view taken on line 4—4 of Fig. 3;

Fig. 5 is a cross-sectional view taken on line 5—5 of Fig. 1;

Fig. 6 is a view similar to Fig. 2 but showing the tool block in released condition to permit the tool holder to be rotated; and Fig. 7 is a view similar to Fig. 4 but showing the tool holder in released position.

Referring now in detail to the drawing, 10 designates a turret tool block embodying the invention and showing in the drawings to be mounted on a cross-slide 11. The cross-slide 11 is formed with an usual longitudinal, horizontal slot 12 of inverted T-shaped cross-section.

The turret tool block 10 comprises a base 13 having a central upstanding cylindrical portion 14, and horizontal flanges 15 at the ends thereof. Said flanges are formed with vertical through openings 16. Said base is formed with an axial vertical through opening 17, and with a pair of vertical through openings 18 on opposite sides of said axial opening, and in a vertical plane therewith. Said base is furthermore formed on the underside thereof with a longitudinal groove 19 adapted to register with the slot 12. The through openings 16 communicate with said groove 19 for the purpose hereinafter appearing. Said base is furthermore formed with a pair of symmetrical angle shaped openings 20 interconnecting side surfaces of the cylindrical portion 14 with the top surface thereof. Said base 14 is furthermore formed on the underside thereof with a pair of tapped openings 23 likewise communicating with the groove 19.

Received within the groove 19 are a pair of base aligning plates 25 attached to said base by screws 26 passing through countersunk openings in said plates and screwed into the tapped openings 23. Said plates 25 are formed with drilled holes 28 registering with the holes 16. The aligning plates 25 project into the slot 12 and serve to guide the tool block on the cross-slide.

The tool block may be fixed to the cross-slide in various adjusted positions by means of screws 30 passing through the registering openings 16 and 28 and screwed to T-shaped clamp nuts 31 within the slot 12.

Said base 13 is furthermore formed with a vertical through opening 32 disposed in a plane passing through the axis of the axial opening 17 and forming an angle of 45° with a plate passing through the axes of openings 18. Said through opening 32 is tapped at its lower end, as at 33.

Rotatably mounted on the base 13 is a tool holder 35. Said tool holder may be square in horizontal cross-section. At the lower end thereof it has an annular cylindrical socket opening 36, forming a downwardly extending flange 37 rotatably receiving the upper end of cylindrical portion 14 of the base. The holder 35 is formed with horizontal grooves 37a on the four sides thereof to receive tools 38, which may be clamped to the tool holder by set screws 39 screwed through tapped openings 40 extending down from the top of the holder to the grooves in the manner well known in the art. The tool holder 35 is formed with a central axial through opening 42. Said opening 42 is greater in diameter than the opening 17 and coaxial therewith.

The undersurface of the tool holder 35 is formed with a shallow circular undercut or recess 43 for the purpose hereinafter appearing. Said recess 43 may be smaller in diameter than the inner surface of the opening 36.

Said tool holder is furthermore formed on the underside thereof with four counterbored vertical openings 45 disposed in a pair of vertical planes at right angles to each other and passing through the axis of openings 42, and disposed at 45° to a plane passing through the axes of openings 18. The openings 45 are the same distance from the axis of opening 42 as opening 32 is from axis 17. Thus each of the openings 45 in the tool holder will selectively register with the opening 32 in the base, as the tool holder is rotated about the base.

Said tool holder 35 is furthermore formed with vertical openings 45a of reduced diameter coaxial with the openings 45 and extending to the top surface of the tool holder. The openings 45a are tapped at their upper end as at 45b. Screwed within the tapped portion 45b of the openings 45a are set screws 45c for the purpose hereinafter appearing.

The recessed undersurface 43 of the tool holder 35 is formed with countersunk openings 46 set 90° apart from each other and spaced from the axis of the tool holder the same distance as the openings 18 are spaced from the axis of the base.

Said openings 46 are disposed in a pair of vertical planes at right angles to each other, and at 45° to the planes passing through the axes of openings 45 and the axis of the central opening 42.

Extending through the openings 42 and 17 is a vertical shaft 50. Said shaft comprises a portion 51 extending within opening 17 and threaded on its lower end, as at 52, to receive a nut 53 adapted to clamp the shaft to the base. Said shaft is formed with an enlarged shank portion 54 journalled within the opening 42. Extending up from the shank 54 is a bifurcated portion 55 formed with a transverse slot 56 open at the top. The portions 57 of the shaft on opposite sides of the slot 56 are formed with aligned openings 58 to receive a transverse pivoted pin 59. The bottom surface 60 of the slot 56 is disposed substantially at the level of the upper surface of the tool holder 35, when the tool holder is in locked position, as shown in Fig. 2 of the drawing.

It will now be understood that the tool holder 35 may rotate about the shaft 50, and it may also reciprocate on said shaft.

Means is provided to locate the tool holder in each of four positions, 90° apart. To this end there is slidably mounted in each of the openings 18 an inverted tube, sleeve or locating pin 65 open at its bottom end and formed with a semi-spherical top wall 66 adapted to project into said openings 46. Received within each tube 65 and interposed between the top wall thereof and an aligning plate 25 is a spring 68 adapted to normally retain the upper end of the tube within an opening 46. Furthermore when the tool holder is released, in the manner hereinafter appearing, the springs 68 are sufficiently strong to lift the tool holder on the shaft for the purpose hereinafter appearing.

Means is provided to lock the tool holder in each one of four indexed positions, the same being the positions in which the locating tubes or members 65 engage the recessed openings 46. To this end there is screwed within the tapped opening 33, a lock pin screw plug 70. Within the opening 32 and above the screw plug there is forcefitted a sleeve or bushing 71 the lower edge whereof is spaced above the screw plug and the upper edge whereof is substantially at the level of the top of the base 13.

Slidably mounted within the sleeve or bushing 71 is a lock pin 71a formed with a socket opening 74 on the underside thereof, and having an outwardly extending annular flange 75 at its lower end adapted to engage the lower end of bushing 71. The upper end of the lock pin 71a is tapered or frusto-conical, as designated by numeral 76. Within the socket 74 and interposed between the lock pin 71a and the screw plug 70, is a coil compression spring 78 normally pressing the lock pin upwardly. The upper end of the lock pin projects above the base and is adapted to be received in one of the openings 45.

Within each opening 45 is forcefitted a lock pin socket member or bushing 80 having a tapered opening 81 at its lower end adapted to receive the tapered portion 76 of the lock pin 71a. Within each opening 45 and above the socket member or bushing 80 is a disc 83, preferably formed with a central opening. In the event that it is desired to knock the bushings 80 out of the openings 45, the set screws 45c are removed and a rod passed through the openings 45a to strike the disc which thus serves to remove the bushings.

When the tool holder 35 is lifted, spring 78 will cause the lock pin 71a to move up until the flange 75 engages the lower end of bushing 71. When the tool holder is released the springs 68 serve to lift the tool holder to a position where the recessed surface 43 is above the lock pin 71a whereby to permit the tool holder to be rotated about its axis.

As the tool holder is rotated, the locating pins or sleeves are forced out of the openings 46 but still press against said recessed surface. Said pins or sleeves 65 snap into the openings 46 to locate the tool holder in each of its index positions. In each of said positions the lock pin 71a will be in alignment with one of the sockets or bushings 80 so that downward pressure on the tool holder 35 will cause engagement of the lock pin in one of the sockets to lock the tool holder in an indexed position.

Releasable clamp means is provided to clamp the tool holder in each of its indexed positions, said means being releasable to permit rotation of the tool holder to each of its indexed positions. To this end there is mounted on the pivot pin 59, an eccentric cam 90. Said cam is locked to the pin 59 by a set screw 91 screwed within a threaded opening 92 in the cam. The head of the set screw projects beyond the cam for the purpose hereinafter appearing. The cam 90 is circular as shown in the drawing, and is formed with a through opening 93 eccentrically located and registering with the openings 58 in the vertical shaft and receiving the pivot pin 59. The cam 90 is furthermore formed with a socket 93a extending radially with respect to the center of the cam and mounted on the cam is a handle 94 having a stem fitted within said socket and carrying a knob 95 at its outer end.

Mounted on the tool holder 35 and surrounding the shaft portion 54 is a flat annular washer 96. Interposed between the washer 96 and the cam 90 and disposed within the slot 56 and above the bottom of the slot is a cam shoe 100.

Said cam shoe has a flat bottom surface 101 resting on the washer 96. At the top thereof said shoe has a part cylindrical surface 102 engaged by the outer surface of the cam 90. The radius of curvature of surface 102 is the same as the radius of curvature of the outer surface of the cam 90.

It will now be understood that when the handle 94 is rotated in a clockwise direction from the position shown in Fig. 6 to the position shown in Fig. 2, the cam shoe 100 will be slidably moved to the left on the washer 96 and at the same time will press the tool holder 35 downwardly against the pressure of springs 68 to clamp the tool holder in one of its index positions. The cam and cam shoe are so designed and proportioned relative to the base and tool holder that a diametrical line passing through the center of the cam and the axis of the cam is on the leading side of a vertical line passing through the cam when the tool holder is in clamped position. The cam hence approaches but does not reach dead center when the tool holder is clamped, thus allowing for wear.

To release the tool holder the handle 94 is swung in a counterclockwise direction from the position shown in Fig. 2 to the position shown in Fig. 6, thus permitting the spring 68 to lift the tool holder and clear the locking pin whereby to allow the tool holder to be rotated.

The head of the set screw 91 is adapted to engage a rounded groove 105 in the shoe block, serving as a stop to limit rotation of the cam in releasing position.

Fixed to the underside of the cam shoe 100 and projecting downwardly therefrom is a pin 106 adapted to substantially contact the inner edge of the washer 96 when the device is in released position to prevent the shoe from coming out from between the cam and the tool holder.

The angle shaped air holes 20 serve to prevent suction between the tool holder and base to facilitate lifting of the tool holder by the springs. The under cut or recess 43 furthermore reduces the contact surface between the bottom of the tool holder and the top of the base to prevent a binding due to presence of lubricating oil.

The tubes or pins 65 may be formed with air holes 111 likewise to permit the free reciprocation of said tubes.

It will be noted that the cam shoe serves as a wedge between the cam and holder. Furthermore, the cam shoe has a relatively large friction surface with the washer, reducing wear. Wear is also reduced on the cam because the pressure is not at one point of the cam only.

The purpose of spring 78 is to take care of inequalities in wear and fit. The spring 78 presses the lock pin firmly in the socket bushing 80. When the tool holder comes down it compresses spring 78 to ensure a perfect fit.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A turret tool block comprising a base, a shaft on said base and extending upwardly therefrom, a tool holder rotatably mounted on said shaft, an eccentric cam pivotally mounted on said shaft, a cam shoe slidable perpendicular to the axis of the holder, and interposed between said cam and holder, means on the shaft to retain said shoe against rotation said cam shoe having a curved surface engaging said cam and having the same radius of curvature as the surface of the cam engaged thereby, means to limit movement of said cam shoe relative to said holder upon moving the cam toward releasing position, and means to limit rotation of said cam upon moving said cam toward releasing position.

2. A turret tool block comprising a base, a shaft on said base and extending upwardly therefrom, a tool holder rotatably mounted on said shaft, an eccentric circular cam pivotally mounted on said shaft, a cam shoe interposed between said cam and holder, and slidably mounted on said holder, said cam shoe having a curved surface engaging said cam and having the same radius of curvature as the surface of the cam engaged thereby, whereby rotation of said cam will cause movement of said shoe on said holder, a locking pin on said base, said tool holder being formed on the underside thereof with a plurality of angularly spaced sockets adapted to selectively receive said locking pin, and spring means to raise the tool holder, when the cam is released, to clear the locking pin whereby to permit rotation of the tool holder relative to the base, said tool holder being formed with a plurality of spaced recesses adapted to cooperate with said spring means to locate the tool holder in its various indexed positions.

3. A turret tool block comprising a base, a tool holder mounted on said base for rotation about the axis of said holder, and being adapted to reciprocate thereon longitudinally of said axis, means to locate said holder in a plurality of index positions, locking means on said base, said holder having means to receive said locking means in each of said index positions, said locating means including means to raise the holder on the base to clear the locking means on the holder and permit rotation of the holder.

4. A turret tool block comprising a base, a tool holder mounted on said base for rotation about the axis of said holder, and being adapted to reciprocate thereon longitudinally of said axis, means to locate said holder in a plurality of index positions, locking means on said base, said holder having means to receive said locking means in each of said index positions, said locating means including means to raise the holder on the base to clear the locking means on the holder and permit rotation of the holder, an eccentric circular cam mounted on the base, and a cam shoe interposed between said cam and holder, said shoe having a part circular surface contacting said eccentric cam.

5. In combination, a base, an upstanding shaft thereon, an indexible member on said base, rotatably mounted on said shaft, said shaft having a slot at its upper end, a cam in said slot and pivoted to said shaft, a cam shoe in said slot interposed between said cam and member, having a curved surface conforming to a surface of the cam engaged thereby, a washer on said shaft interposed between said cam shoe and member, said washer overlapping said slot, and a pin on said shoe projecting into the opening in said washer.

6. In combination, a base member, a tool holder member rotatably and slidably mounted thereon, a locking element mounted on one of said members, a socket element mounted on the other of said members to receive said locking element, one of said elements being movable relative to the member on which it is mounted, resilient means to press said movable elements into contact with said other element upon moving said holder member toward said base member, means to limit the movement of said movable element to a predetermined extent, spring means to move said holder member away from said base member a distance greater than the movement of said movable element to permit relative rotation between said members, and means to move said holder member toward said base member, including a rotary cam and a cam shoe engaging said cam and interposed between said cam and holder, said cam shoe being movable relative to said holder upon rotating said cam.

SECONDO L. CASELLA.

REFERENCES CITED

The following references are of record in the file of this patent:

UNITED STATES PATENTS

| Number | Name | Date |
|---|---|---|
| 132,432 | Blackman | Oct. 22, 1872 |
| 201,956 | Shepard | Apr. 2, 1878 |
| 1,232,999 | Tolles | July 10, 1917 |
| 1,263,166 | Walker | Apr. 16, 1918 |
| 1,636,167 | Bozsin | July 19, 1927 |
| 2,202,117 | Muller | May 28, 1940 |

FOREIGN PATENTS

| Number | Country | Date |
|---|---|---|
| 74,708 | Austria | Sept. 25, 1918 |
| 150,205 | Great Britain | Sept. 2, 1920 |